US010747288B2

(12) United States Patent
McDaniel (10) Patent No.: US 10,747,288 B2
(45) Date of Patent: Aug. 18, 2020

(54) ENCODED DRIVE POWER ENABLE FOR STORAGE ENCLOSURES WITH STORAGE DRIVES

(71) Applicant: DELL PRODUCTS, L.P., Round Rock, TX (US)

(72) Inventor: Ryan C. McDaniel, Hopkinton, MA (US)

(73) Assignee: Dell Products, L.P., Round Rock, TX (US)

( * ) Notice: Subject to any disclaimer, the term of this patent is extended or adjusted under 35 U.S.C. 154(b) by 118 days.

(21) Appl. No.: 16/165,516

(22) Filed: Oct. 19, 2018

(65) Prior Publication Data
US 2020/0125155 A1 Apr. 23, 2020

(51) Int. Cl.
*G06F 11/00* (2006.01)
*G06F 1/30* (2006.01)
(52) U.S. Cl.
CPC ............ *G06F 1/30* (2013.01); *G06F 2201/85* (2013.01)
(58) Field of Classification Search
CPC ... G06F 1/28; G06F 1/30; G06F 1/305; G06F 11/201; G06F 11/2002; G06F 11/2017; G06F 2201/85; G06F 11/2089
See application file for complete search history.

(56) References Cited

U.S. PATENT DOCUMENTS

| 7,139,920 B2 * | 11/2006 | Williams | G06F 1/28 713/300 |
| 7,925,930 B2 * | 4/2011 | Suzuki | G06F 11/201 710/14 |
| 10,073,625 B2 * | 9/2018 | Guyot | G06F 11/3485 |

OTHER PUBLICATIONS

Dell Inc., "Dell Storage Center SCv2000 and SCv2020 Storage System Deployment Guide", 2016.

* cited by examiner

*Primary Examiner* — Marc Duncan
(74) *Attorney, Agent, or Firm* — Isidore PLLC (57) ABSTRACT

A method and system for power management of storage drives. The method includes selecting an initial predetermined dual bit pattern that corresponds to a select power state of the storage drive, for providing to a first and second bit pin of a bit pin pair of a power control circuit that respectively connects to the storage drive. The method includes providing the initial predetermined dual bit pattern to the power control circuit which generates a discrete signal to the storage drive. The method includes encoding the initial predetermined dual bit pattern on the first bit pin and the second bit pin to selectively implement a power change on the storage drive in response to identification of a fault condition. In response to detection of the fault condition, the method includes selectively managing power to the storage drive based on input of the discrete signal.

20 Claims, 5 Drawing Sheets

ENCODED DRIVE POWER ENABLE FOR STORAGE ENCLOSURES WITH STORAGE DRIVES

1. TECHNICAL FIELD

The present disclosure generally relates to an information handling system and in particular to local key management setup in an information handling system.

2. DESCRIPTION OF THE RELATED ART

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprise class storage system enclosures can handle large volumes of data and large numbers of users associated with networks of information handling systems. Enterprise class storage devices, or enclosures, are designed for high availability. These storage devices traditionally use a combination of methods for protecting data from loss and ensuring access to the data in response to a failure of any component in the system and/or network of systems. Large storage enclosures with many drives require a large number of side-band signals for control and status monitoring of each drive. Various integrated circuits and/or input/output bus devices are utilized to control power to each drive of a storage enclosure. However, a failure of the integrated circuit and/or bus device has the potential to inadvertently assert a power disable signal to multiple drives at once, creating a data unavailability or data loss event in association with the multiple drives.

BRIEF SUMMARY

Disclosed are a method and an information handling system (IHS) for power management of drives in a storage device. The method includes selecting an initial predetermined dual bit pattern that corresponds to a select power state of the storage drive. The initial predetermined dual bit pattern is provided to a first bit pin and a second bit pin of a bit pin pair. The bit pin pair is associated with a power control circuit that respectively connects to the storage drive. The method provides the initial predetermined dual bit pattern to a circuit element of the power control circuit. The circuit element converts the initial predetermined dual bit pattern to a single bit, which provides a discrete signal to a power input component of the storage drive. The discrete signal selectively implements the power change during the fault condition. The method includes encoding, by a processor, the initial predetermined dual bit pattern on the first bit pin and the second bit pit of the bit pin pair of the power control circuit corresponding to the initial predetermined dual bit pattern. The predetermined dual bit pattern is encoded on the storage drive in response to identification of a fault condition associated with the storage drive. In response to detection of a fault generated dual bit pattern, the method includes selectively managing power to the storage drive based on input of the discrete signal. The discrete signal selectively identifies a power state that conditionally implements a power change.

An information handling system for power management of storage drives in a storage device includes a processor, and a storage drive. The information handling system also includes a power control circuit having a first control circuit and a second control circuit that are respectively coupled to the storage drive. The power control circuit selectively powers the storage drive. Further, the information handling system includes a service processor communicatively coupled to the storage drive and to the power control circuit. The power control circuit executes a power encoder module that configures the service processor to select an initial predetermined dual bit pattern that corresponds to a select power state of the storage drive during a fault condition. The initial predetermined dual bit pattern is provided to a first bit pin and a second bit pin, which represent a bit pin pair of a power control circuit. The power control circuit respectively connects to the storage drive. The service processor provides the initial predetermined dual bit pattern to a circuit element of the power control circuit. The circuit element converts the initial predetermined dual bit pattern to a single bit. The circuit element generates a discrete signal that is sent to a power input component of the storage drive to selectively implement the power change for use during a fault condition. The service processor encodes the initial predetermined dual bit pattern on the first bit pin and the second bit pin of the bit pin pair of the power control circuit. The encoded initial predetermined dual bit pattern selectively implements a power change, corresponding to the initial predetermined dual bit pattern, on the storage drive. In response to detection of a fault generated dual bit pattern, the service processor selectively manages power to the storage drive based on input of the discrete signal. The discrete signal selectively identifies a power state that conditionally implements a power change.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system for power management of storage drives in a storage device. The information handling system includes a processor and a storage drive. The information handling system also includes a power control circuit having a first control circuit and a second control circuit that are respectively coupled to the storage drive. The power control circuit selectively powers the storage drive. Further, the information handling system includes a service processor communicatively coupled to the storage drive and to the power control circuit. The power control circuit executes a power encoder module that configures the service processor to select an initial predetermined dual bit pattern that corresponds to a select power state of the storage drive during a fault condition. The initial predetermined dual bit pattern is provided to a first bit pin and a second bit pin, which are a bit pin pair of a power control circuit. The power control circuit respectively connects to the storage drive. The service processor provides the initial predetermined dual bit pattern to a circuit element of the power control circuit. The circuit element converts the initial predetermined dual bit pattern to a single bit. The circuit element generates a discrete signal that is sent to a power input component of the storage drive to selectively implement the power change for use during a fault condition. The service processor encodes the initial predetermined dual bit pattern on the first bit pin and the second bit pin of the bit pin pair of the power control circuit. The encoded initial predetermined dual bit pattern selectively implements a power change, corresponding to the initial predetermined dual bit pattern, on the storage drive. In response to detection of a fault generated dual bit pattern, the service processor selectively manages power to the storage drive based on input of the discrete signal. The discrete signal selectively identifies a power state that conditionally implements a power change.

The storage drive is coupled to a power control circuit to selectively power the storage drive. A service processor communicatively couples to the storage drive and to the power control circuit. The service processor executes a power encoder module that configures the service processor to select an initial predetermined dual bit pattern that corresponds to a select power state of the storage drive. The service processor provides the initial predetermined dual bit pattern to a first bit pin and a second bit pin of a bit pin pair of the power control circuit. The initial predetermined dual bit pattern is selectively implemented in response to identification of a fault condition associated with the storage drive. The service processor encodes the initial predetermined dual bit pattern on the first bit pin and the second bit pin of the bit pin pair to selectively implement a power change. The power change corresponds to the initial predetermined dual bit pattern on the storage drive. The service processor provides the initial predetermined dual bit pattern to a circuit element of the power control circuit, and the circuit element converts the initial predetermined dual bit pattern to a single bit. The circuit element generates a discrete signal that is sent to a power input component of the storage drive to selectively implement the power change for use during the fault condition. In response to detection of a fault generated dual bit pattern, the service processor selectively manages power to the storage drive based on input of the discrete signal. The discrete signal selectively identifies a power state that conditionally implements a power change.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 1:
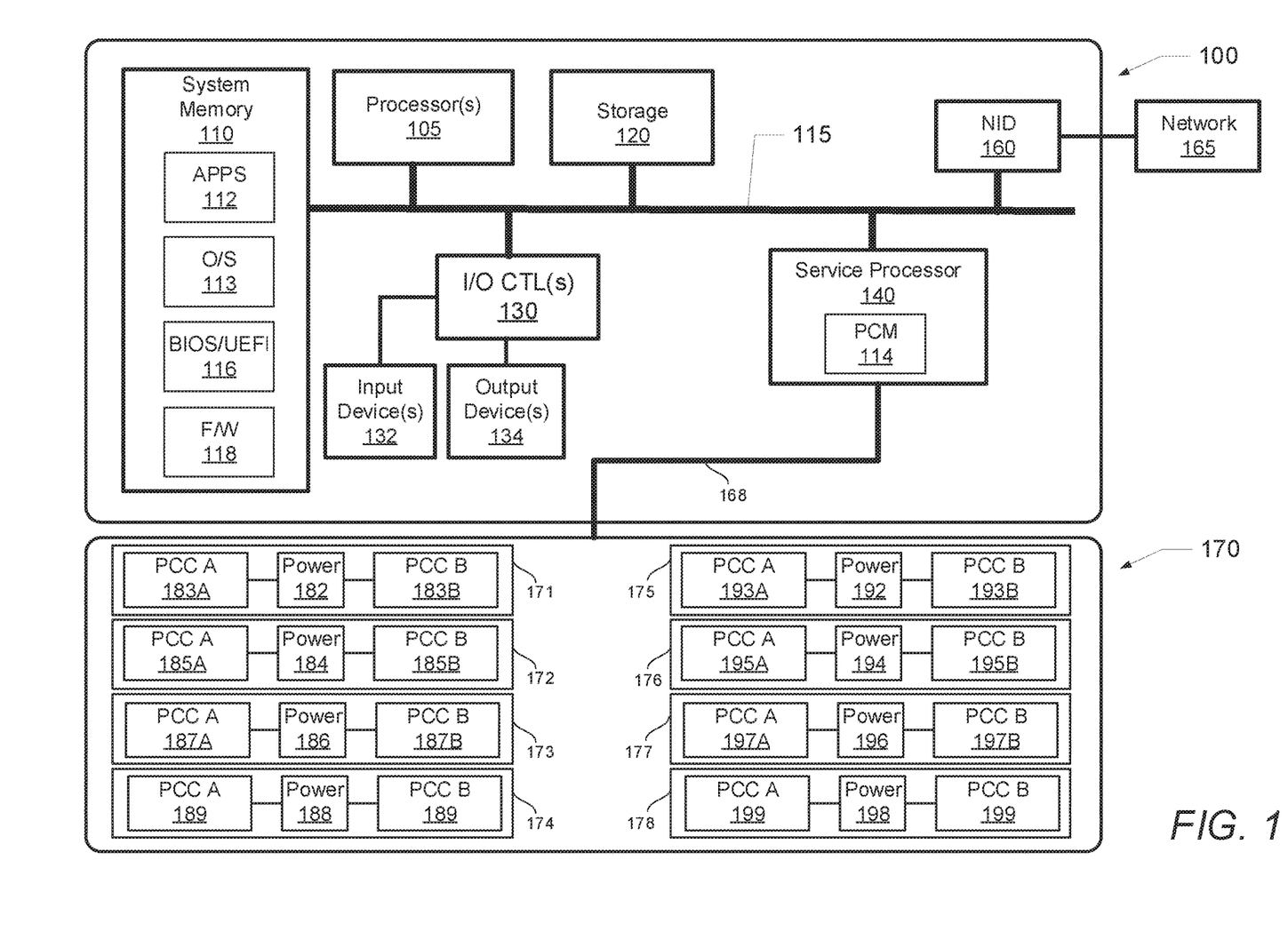
FIG. 1 illustrates an example information handling system having a service processor and memory storage device within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 113, basic input/output system/unified extensible firmware interface (BIOS/UEFI) 116 and other firmware (F/W) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further comprises a network interface device (NID) 160. NID 160 enables IHS 100 to communicate and/or interface with other devices, services, and components that are located external (remote) to IHS 100. These devices, services, and components can interface with IHS 100 via an external network, such as example network 165, using one or more communication protocols. In one embodiment, a customer provisioned system/platform comprises multiple devices located across a distributed network, and NID 160 enables IHS 100 to be connected to these other devices. Network 165 can be a local area network, wide area network, personal area network, and the like, and the connection to and/or between network and IHS 100 can be wired or wireless or a combination thereof. For purposes of discussion, network 165 is indicated as a single collective component for simplicity. However, it is appreciated that network 165 can comprise one or more direct connections to other devices as well as a more complex set of interconnections as can exist within a wide area network, such as the Internet.

Additionally, IHS 100 includes service processor 140, which includes power control module (PCM) 114. Service processor 140 may communicate with a network or an external device, for example data storage device(s) 170. Data storage device 170 can be any storage or group of storage devices (e.g. storage devices within an enclosure) that enable access to data storage medium, such as storage drives 171, 172, 173, 174, 175, 176, 177, and 178. Each of storage drives 171-178 include a power switch circuit that enables and/or disables power to a respective storage drive. More specifically, storage drives 171, 172, 173, 174 respectively include power switch circuits 182, 184, 186, and 188. Also, storage drives 175, 176, 177, and 178 respectively include power switches 192, 194, 196, and 198. Additionally, each of storage drives 171-178 includes a first and second power control circuits (PCCs). As illustrated, storage drives 171-178 respectively include PCC (A and B) 183A and 183B, 185A and 185B, 187A and 187B, 189A and 189B, 193A and 193B, 195A and 195B, 197A and 197B, as well as 199A and 199B. Communication between service processor 140 and each storage drive 171-178 is provided via general purpose input/output (GPIO) interface device 168 connecting to a respective PCC circuit. Service processor 140 can provide control signals to storage drive 171-178 via GPIO interface device 168. GPIO interface device 168 connects to pins on an integrated circuit coupled to data storage device 170 within an enclosure. The integrated circuit can be for example, an external field-programmable gate array (FPGA) for GPIO expansion, two wire interface (TWI) bus GPIO expanders, or shift registers creating a SGPIO chain. The integrated circuit is associated with a respective PCC coupled to a storage drive (171-178), or provides a signal to the respective PCC coupled to storage drive (171-178).

Each storage drive 171-178 is a dual port drive, where each port of the drive has a first data access path and a second data access path. In one embodiment, storage drives 171-178 are configured with at least a first portion and a second portion, where the first portion and the second portion include one or more parity storage disks for data recoverability. In one example, storage drive 171 has the first data access path connected to PCC A 183A and the second access path connected to PCC B 183B. Each data access path and respective PCC (183A and 183B) operate independently, while maintaining equal access to data stored by storage drive 171. Each data access path and PCC (183A and 183B) operate independently to protect data from loss and ensure access to the data continuously in response to a failure and/or fault event detected by service processor 140.

In one embodiment, in response to detection of a fault event or an unresponsive drive, service processor 140 provides a reset signal in the form of the predetermined bit pattern to a respective storage drive. In another embodiment, service processor 140 provides a predetermined bit pattern to the PCC of a respective storage drive that enables a reduction of power to the drive. In still another embodiment, service processor 140 provides a predetermined bit pattern to the PCC of a respective storage drive that enables or disables the power to the drive. Additional aspects of service processor 140 and functionality associated with power control module (PCM) 114 are presented are presented within the description of FIGS. 2-7.

Figure 2:
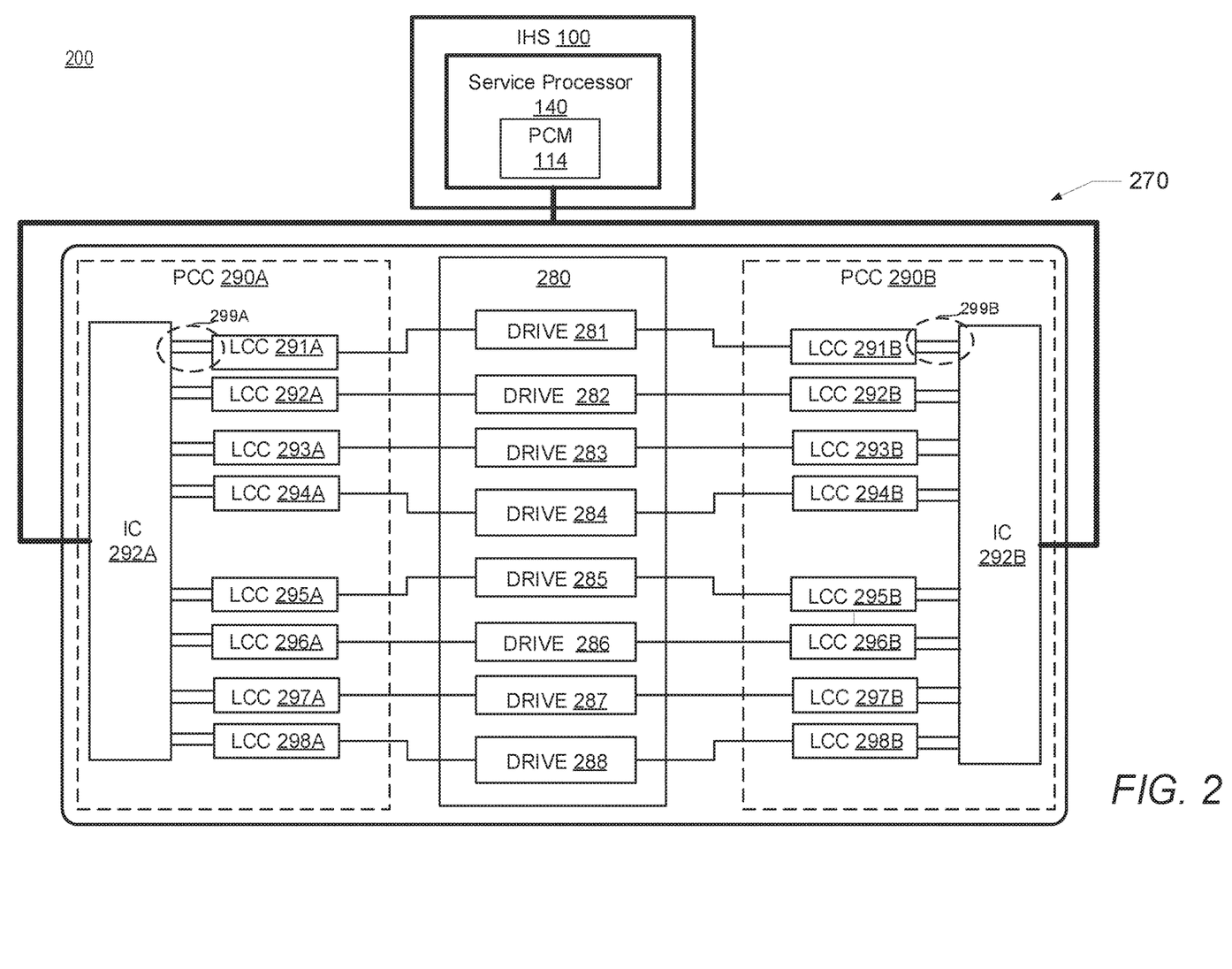
FIG. 2 illustrates example hardware components within the memory storage device of FIG. 1 that are utilized for power management of a storage drive, in accordance with one embodiment.

With reference now to FIG. 2, there is illustrated example hardware components within the memory storage device of FIG. 1 that are utilized for power management of a storage drive. Storage drive system 200 includes IHS 100 and storage device 270. Storage device 270, similar in configuration to storage device 170 (of FIG. 1), includes PCC 290A, PCC 290B, and power control module 280. Power control module 280 includes storage drives 281-288 that each couples to a respective storage drive to manage the power input of the storage drive.

PCC 290A includes integrated circuit (IC) 292A which couples to one or more local control circuits (LCC) 291A-298A (left set of LCC circuits) via an associated dual-bit input. The dual-bit input forms bit pin pair 299. A first LCC, LCC 291A, couples to a first bit pin pair 299A. Each of the subsequent LCCs, LCC 292A-298A couple to a respective subsequent bit pin pair. Each of LCCs 291A-288A is connected to a first input of a respective power input component 281-298.

Similar to the components and connections of PCC 290A, PCC 290B includes IC 292B which couples to one or more local control circuits LCC 291B-298B (right set of LCC circuits) via second bit pin pair 299B. LCC 291B, couples to first bit pin pair 299B. Each of the LCC 292B-298B couple to a respective subsequent bit pin pair. Each of LCCs 291B-298B is connected to an input of a respective storage drive 281-288.

Service processor 140 includes PCM 114 and is connected to each storage drive via one or more inputs of IC 292A and 292B. Service processor 140 communicatively couples to storage drive 281-288, where each storage drive is similar in functionality to one of storage drives 171-178 (FIG. 1). PCC 290A and PCC 290B connect to a respective one of storage drive 281-288. Service processor 140 executes PCM 114, which configures service processor 140 to select an initial predetermined dual bit pattern that corresponds to a select power state of storage drive 171. The select power state can be, for instance, ON, OFF, low (power), high (power), or a power input that is dynamically managed by input signals provided by service processor 140.

In operation, a processor, such as service processor 140, provides an initial predetermined dual bit pattern to first bit of bit pin pair 299A and second bit of bit pin pair 299B of PCC 290A and 290B. Service processor 140 encodes the initial predetermined dual bit pattern on first bit pin pair 299A and second bit pin pair 299B of PCC 290A and 290B to identify a power state that conditionally implements a power change in response to detection of a predetermined bit pattern. The power change corresponds to the initial predetermined dual bit pattern, and can be, for instance a binary power change or a power level modification. In response to identification of the fault condition associated with the storage drive, service processor 140 applies the power change to the respective storage drive. In one embodiment, at any one time, only one of PCC 290A and 290B can implement a power change that powers off a respective portion of the storage drive.

In response to receiving the initial predetermined dual bit pattern at LCC 291A-298A and 291B-298B, the circuit element converts the initial predetermined dual bit pattern to a single bit which generates a discrete signal that is sent to storage drive 281-288. The discrete signal selectively identifies a power state that conditionally implements a power change. In response to detection of the fault condition, LCCs 291A-298A and 291B-298B selectively manage power to the respective storage drive based on input of the discrete signal.

In one embodiment, IC 292A and 292B are shift registers. Service processor 140 connects to an input for clock, load, serial in, serial out, and clear for all drives connected to the shift register. Service processor 140 respectively provides a dual bit pattern for each of the storage drives, and the shift register provides a respective bit pair to each of the control circuits connected to the shift register. In another embodiment, another form of an integrated circuit is utilized that enables PCC 290A and 290B to provide the discrete signal to a power input component connected to storage drive 281-288. For example, a Two Wire Interface (TWI) bus and a TWI interface can be utilized to output the discrete signal to the power input circuit of a respective storage drive (281-288). The TWI bus includes general purpose input/output expanders to receive the predetermined pit pattern from service processor 140. Further, a FPGA or ASIC can be utilized to receive the predetermined dual bit pattern from service processor 140.

Storage drive system 200 enables PCC 290A and PCC 290B to provide several advantages. Utilizing a bit pin pair such as first bit pin pair 299A and second bit pin pair 299B to supply a bit pattern to a respective LCC (291A-298A and 291B-298B) is advantageous over providing a single bit to the shift register. Supplying the dual bit pattern to LCC (291A-298A and 291B-298B) is advantageous because the predetermined dual bit mitigates accidental assertion of high (one) or low (zero) signal. Accidentally asserting a high or low signal to a power source can inadvertently enable/disable multiple storage devices, negatively impacting data availability. By assertion of the predetermined dual bits, service processor 140 limits the number of storage drives that can power down during detection of the fail condition.

Figure 3:
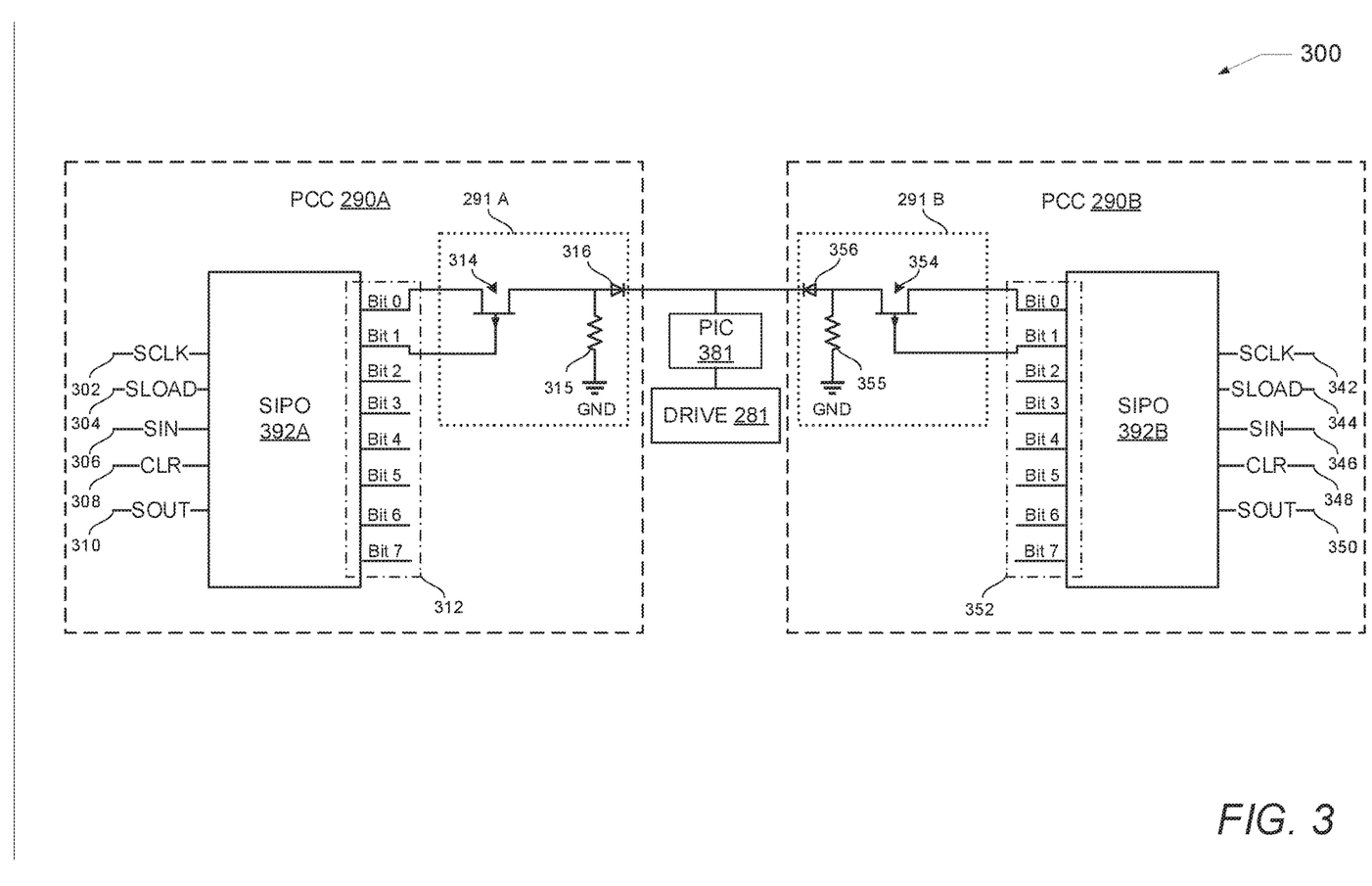
FIG. 3 illustrates power control circuits for providing power control signals to a storage drive, in accordance with one embodiment.

FIG. 3 illustrates power control circuits for providing power control signals to a storage drive. Power control circuit 300 includes PCC 290A and PCC 290B coupled to an input of power input component (PIC) 381, and PIC 381 couples to an input of storage drive 281 and controls the input power thereof. PCC 290A includes serial input parallel output (SIPO) 392A which has a plurality of data pins having varying pin assignments. A first pair of data pins associated with SIPO 392A couple to a first and second input of LCC 291A. LCC 291A includes an output that couples to a first input of PIC 381. Similarly, PCC 290B includes SIPO 392B which has a plurality of data pins having varying pin assignments. A first pair of data pins associated with SIPO 392B couple to a first and second input of LCC 291B. LCC 291B includes an output that couples to a second input of PIC 381.

SIPO 392A and 392B are shift registers. Each of SIPO 392A and 392B include a first plurality of data pins for serial data input. The serial data inputs for SIPO 392A and 392B includes serial clock (SCLK) 302, 342, serial load (SLOAD) 304, 344, serial in (SIN) 306, 346, clear 308, 348, and serial out (SOUT) 310, 350. Each of SIPO 392A and 392B also include a second plurality of pins, or parallel output pins 312 and 352, where each pin pair connects to a respective LCC circuit (291A and 291B).

LCC circuit 291A includes a P-channel field effect transistor (PFET) 314, resistor 315, and diode 316. PFET 314 has a first terminal that connects to a first parallel output pin of SIPO 392A, a second terminal that connects to a second parallel output pin of SIPO 392A, and a third terminal. The third terminal of PFET 314 connects to a first terminal of resistor 315. The first terminal of resistor 315 also connects to diode 316. A second terminal of resistor 315 connects to ground. Diode 316 includes an output terminal that connects to PIC 381. LCC circuit 291B mirrors LCC 291A. LCC circuits 291B includes a power field effect transistor (PFET) 354, resistor 355, and diode 366. PFET 354 has a first terminal that connects to a first parallel output pin of SIPO 392B, a second terminal that connects to a second parallel output pin of SIPO 392B, and a third terminal. The third terminal of PFET 354 connects to a first terminal of resistor 355. The first terminal of resistor 355 also connects to diode 356. A second terminal of resistor 355 connects to ground (GND). Diode 356 includes an output terminal that connects to PIC 381.

In operation, LCC 291A and/or 291B receive a first bit and a second bit from a respective parallel output pins 312 of SIPO 392A and/or parallel output pins 352 of SIPO 392B. A first bit drives the gate of the PFET 314 and/or 354 and the second pin sources voltage utilized to assert a POWER_DOWN signal to a respective storage drive (281) via PIC 381. Resistors 315 and 355 are pull-down resistors for forcing the default power state to ON. The cathodes of diodes 316 and 356 are coupled together and input to PIC 381. The respective diodes 316 and 356 prevent back feeding and driver conflict should both PCC 290A and PCC 290B attempt to power down the respective storage drive (281) at the same time.

In one embodiment, PCC 290A is coupled to at least a first portion of storage drive 281. SIPO 392A includes output bit pins zero (0) through seven (7). LCC 291A includes a first terminal for coupling to a first bit (Bit 0) of a bit pin pair that is coupled to SIPO 392A. A second terminal couples to a second bit (Bit 1) of the bit pin pair coupled to SIPO 392A. Service processor 140 encodes an initial predetermined dual bit pattern on the first bit pin of the bit pin pair and the second bit pin of the bit pin pair based on an initial state of the shift register. The initial predetermined dual bit pattern correlates to a desirable state of storage drive 281 in response to a particular fault condition from among a plurality of fault conditions that are detectable by service processor 140. More specifically, each fault condition generates a unique detectable signal. In one embodiment, the fault condition corresponds to a pre-identified fault activity associated with the specific fault condition. In another embodiment, the fault condition, such as a glitch on SCLK 302, generates a bit shift on the shift register. The bit shift on the shift register automatically shifts a bit from a first bit pin to a next bit pin on the shift register.

In one example, in response to service processor 140 detecting the fault condition, service processor 140 provides one of an active high signal and an active low signal for each bit of the initial predetermined dual bit pattern to a circuit element, such as PFET 314, via SIPO 392A. PFET 314 provides one of the active high signal and the active low signal to diode 316, based on the combination of the input bit pins. PFET 314 generates the discrete signal to manage a power input of the storage drive. In one example, a first predetermined bit pair value, "00" (Bit 0=0, Bit 1=0), is input on the first pin pair. The predetermined bit pair value provides a low discrete signal and does not disable the power to storage drive 281. This results in a predetermined voltage level being provided to storage drive 281 without interruption. The predetermined voltage level is relative to the type of operative storage drive. For example, 12 volts for non-volatile memory express (NVMe) drives and 12 volts plus 5 volts for serial attached small computer system interface (SCSI) (SAS) drives. Alternatively, a second predetermined bit pair value "10" (Bit 0=1, Bit 1=0) can be input. The predetermined bit pair value of 10 turns PFET 314 ON, generates a logic high signal (1) to PIC 381, and results in storage drive 281 powering down. In another example, a predetermined bit pair value "11" (Bit 0=1, Bit 1=1) can be input. The predetermined bit pair value provides a low discrete signal and does not disable the power to storage drive 281. This results in predetermined voltage level being provided to storage drive 281 without interruption.

The predetermined encoding scheme selected includes utilizing different bit values (1 and 0) on each pin of the SIPO (392A and 392B) to turn off power to a respective storage drive. In another embodiment, a different integrated circuit component can be utilized to provide the predetermined bit pair to PCC 290A and/or 290B. PCC 290A and 290B prevent a power down, or power disable, from being accidentally asserted in response to detection of a shift register fault. The predetermined, dual bit pattern encoding scheme and power control circuit (290A and 290B) are advantageous because during fault conditions that cause all bits on the SIPO (392A and 392B) to short to zero or one, power will remain on for most storage drives. Accordingly, data on the storage drive remains accessible during a fault condition. PCC 290A and 290B enable storage drives to be more resilient to failures of shift registers and shift register chains.

Figure 4A:
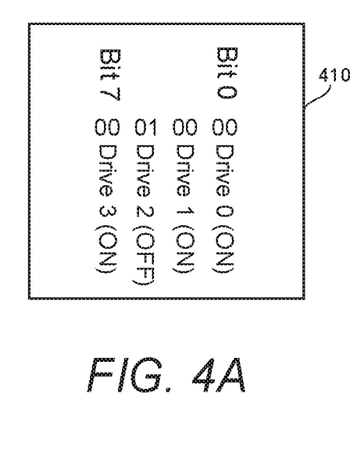
FIG. 4A-C illustrates an example initial encoding pattern for a shift register of a power control circuit, in accordance with one embodiment.
Figure 4B:
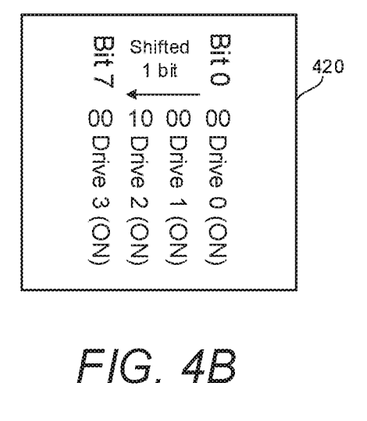
Figure 4C:
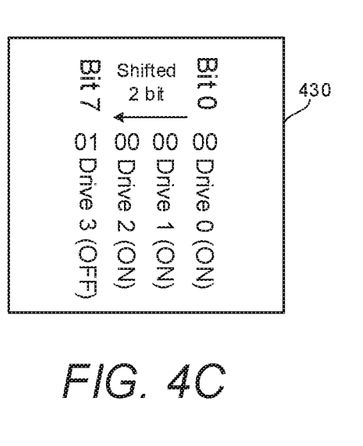

FIG. 4A-C illustrate an example initial encoding pattern for a shift register of a power control circuit. Predetermined dual bit pattern scheme 410, glitch induced dual bit pattern scheme 420, and double glitch induced dual bit pattern scheme 430 include bit pin zero through bit pin seven, which are used to provide a predetermined dual bit pattern to storage drive zero through three. A first and second bit pins connect between an integrated circuit, such as a shift register, and a respective storage drive. Service processor 140 provides one of an active high signal (bit value=1) and an active low signal (bit value=0) for each bit of the initial predetermined dual bit pattern. Service processor 140 provides the high or low signal to the circuit element, PFET 314, of the local control circuit via a SIPO (392A and B). Service processor 140 encodes the initial predetermined dual bit pattern on the first bit pin and the second bit pin of the bit pin pair, based on an initial operating state for the storage drive (281). The initial predetermined dual bit pattern correlates to a desirable state of storage drive (281) in response to the corresponding fault condition. The fault condition is a specific fault condition from among a plurality of fault conditions that are detected by service processor 140. Each fault condition generates a unique detectable signal that corresponds to a pre-identified fault activity associated with the particular fault condition.

In one embodiment, service processor 140 encodes the initial predetermined dual bit pattern on each pair of bit pins of a shift register. The storage drive is connected at a respective pair of pins associated with the shift register. Service processor 140 generates the initial predetermined dual bit pattern to a first bit pin pair and generates a second predetermined dual bit pattern to one or more subsequent bit pin pairs of PCC 290A and 290B. Each of the first and second predetermined dual bit pattern selectively enables or disables power to at least a portion of the respective storage drive. The predetermined dual bit pattern that is selected for enabling the power to the storage drive is a different predetermined dual bit pattern from a predetermined dual bit pattern selected to disable power to the storage drive. The predetermined dual bit pattern can be, for example, an initial predetermined dual bit pattern that correlates to a first state of the storage drive (281) or an initial operating state for the storage drive. In another embodiment, the predetermined dual bit pattern can correspond to a desirable state of the storage drive in response to a fault condition.

In the example of predetermined dual bit pattern scheme 410, the initial and/or default encoded state for having a drive powered on is 00, and the encoded state for having the drive power OFF is 01. For example, in response to the predetermined dual bit pattern for the SIPO (392A) being 0001_0000 before a glitch, all drives except the drive connected to bits four and five are ON (drive two). Specifically, storage drive zero receives a predetermined dual bit pattern of 00, for providing a power enable signal, or "ON" signal, to storage drive. Storage drive one receives a predetermined dual bit pattern of 00, for providing a power enable signal to storage drive 1. Storage drive two receives a predetermined dual bit pattern of 10 for providing input of a power disable signal to storage drive two. Storage drive three receives a predetermined dual bit pattern of 00, again for providing a power enable signal to storage drive three.

In one embodiment, the power control circuit (290A and/or B) receives a fault generated dual bit pattern on the bit pin pair of the power control circuit. The power control circuit (290A and/or B) selectively enables and disables power to the storage drive based on a first dual bit pattern and a second dual bit pattern. The first dual bit pattern is utilized to enable power to the storage. In one example, a glitch (or fault condition) on SCLK 302 shifts the predetermined bit pattern by 1 bit. With the implementation utilizing a power control circuit, such as PCC 290A, instead of the glitch turning all storage drives off, the glitch results in most storage drives staying ON. A glitch on SCLK 302 on the next serial chain cycle results in the fault pattern 0010_0000b as illustrated by glitch induced dual bit pattern scheme 420 in which the one (1) position is shifted to bit pin five. As a result, the drive connected to bits four and five will turn on, but no other drives are affected. A drive turning on under a fault condition, while not desirable, does not lead to data loss or unavailability as would happen if a drive that was supposed to be on was turned off.

In another example, double glitch induced dual bit pattern scheme 430 is associated with a shift register chain that includes two or more SCLKs (302). A serial shift register chain with a double (or any even number of double clocks) would result in a drive further down the chain being turned off. Service processor 140, in this example, selects the default state for ON as 00, the low number of is in the chain advantageously minimizes the chances that a drive will be turned off on a multiple clock glitch. A two-bit shift is shown by double glitch induced dual bit pattern scheme 430. The new bit pattern shows drive 3 is now mistakenly turned off. This fault is limited to one drive, which in a data storage virtualization technology, such as redundant array of independent disks (RAID), would advantageously not result in data unavailability or data loss (DU/DL).

Figure 5:
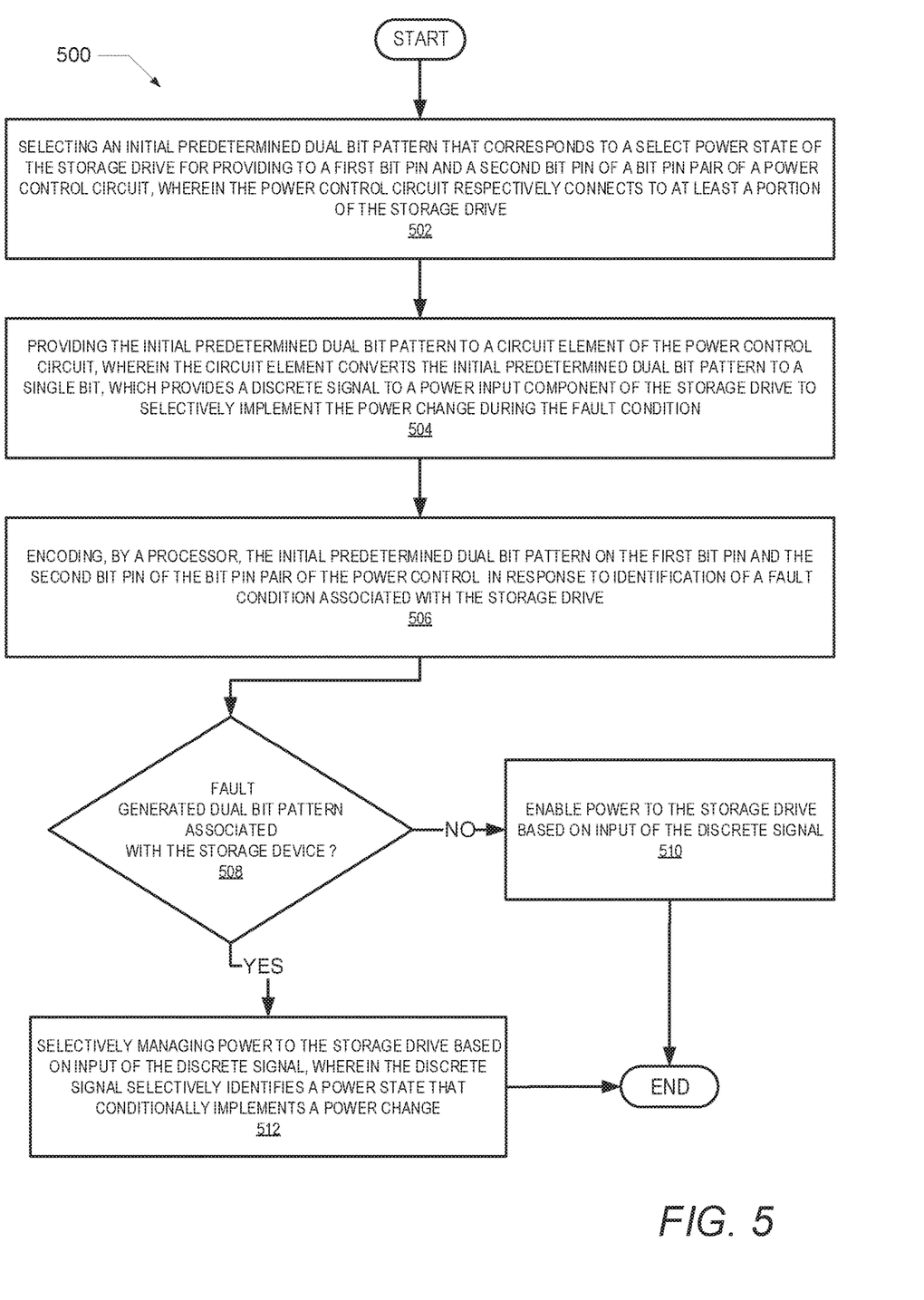
FIG. 5 is a flowchart illustrating a method for selectively managing power to a storage drive, in accordance with one embodiment.

FIG. 5 illustrates a flowchart of exemplary method 500 by which service processor 140 within the preceding figures performs different aspects of the processes that enable the one or more embodiments of the disclosure. The description of method 500 is provided with general reference to the specific components illustrated within the preceding FIGS. 1-4. Generally, method 500 is described as being implemented via service processor 140 and particularly the execution of code, provided by PCM 114, within service processor 140. It is however appreciated that certain aspects of the described methods may be implemented via other processing devices, for example processor 105, and/or execution of other code.

FIG. 5 specifically illustrates a method for selectively managing power to a storage drive (281), in accordance with one embodiment. Method 500 begins at the start block and proceeds to block 502 where method 500 includes selecting an initial predetermined dual bit pattern (410) that corresponds to a select power state of the storage drive (281) for providing to a first bit pin (299A) and a second bit pin of a bit pin pair of a power control circuit (290A). The power control circuit (290A) respectively connects to the storage drive (281). At block 504, the method includes providing the initial predetermined dual bit pattern to a circuit element (314) of the power control circuit (290A). The circuit element converts the initial predetermined dual bit pattern to a single bit, which provides a discrete signal to a power input component of the storage drive (281) to selectively implement the power change during the fault condition. At block 506, method 500 includes encoding, by a processor (140), a change to the initial predetermined dual bit pattern on the first bit pin and the second bit pit of the bit pin pair of the power control circuit in response to identification of a fault condition associated with the storage drive (281). The circuit element outputs a discrete signal to a power input component of the storage drive to selectively implement the power change for use during the fault condition. The method includes determining, at decision block 508, whether the change to the initial dual bit pattern output during a fault condition corresponds to a power off signal. In response to the change to the initial dual bit pattern not corresponding to a power off signal, at block 510, the power control circuit enables power to the storage drive based on input of the discrete signal. In response to the change to the initial dual bit pattern corresponding to a power change, at block 512, the PCC selectively manages power to the storage drive based on input of the discrete signal. The discrete signal selectively identifies a power state that conditionally implements a power change. The method concludes and the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed:

1. A method in an information handling system (IHS) for power management of a storage drive in a storage device, the method comprising:
    selecting an initial predetermined dual bit pattern that corresponds to a select power state of the storage drive for providing to a first bit pin and a second bit pin of a bit pin pair of a power control circuit, wherein the power control circuit respectively connects to at least a portion of the storage drive;

providing the initial predetermined dual bit pattern to a circuit element of the power control circuit, wherein the circuit element converts the initial predetermined dual bit pattern to a single bit, which provides a discrete signal to a power input component of the storage drive to selectively implement a power change during a fault condition; and encoding, by a processor, the initial predetermined dual bit pattern on the first bit pin and the second bit pin of the bit pin pair of the power control circuit in response to identification of a fault condition associated with the storage drive; and in response to detection of a fault generated dual bit pattern, selectively managing power to the storage drive based on input of the discrete signal, wherein the discrete signal selectively identifies a power state that conditionally implements a power change.

2. The method of claim 1, further comprising:

receiving, at the power control circuit, the fault generated dual bit pattern on at least one bit pin pair of the power control circuit, and selectively enabling and disabling power to the storage drive based on a first dual bit pattern and a second dual bit pattern, wherein, the first dual bit pattern is for enabling power to the storage drive and the second dual bit pattern is different from the first dual bit pattern.

3. The method of claim 1, wherein the initial predetermined dual bit pattern correlates to a desirable state of the storage drive in response to the fault condition, which is a specific fault condition from among a plurality of fault conditions, wherein each fault condition generates a unique detectable signal that corresponds to a preidentified fault activity associated with the specific fault condition.

4. The method of claim 1, wherein the processor encodes the initial predetermined dual bit pattern on the first bit pin of the bit pin pair and the second bit pin of the bit pin pair based on an initial operating state for the storage drive.

5. The method of claim 1, further comprising: providing one of an active high signal and an active low signal for each bit pin of the initial predetermined dual bit pattern to the circuit element via a shift register.

6. The method of claim 5, wherein the circuit element receives one of the active high signal and the active low signal from the shift register for generating the discrete signal to manage a power input of the storage drive.

7. The method of claim 6, wherein the circuit element is a p-channel field effect transistor.

8. The method of claim 1, wherein the power control circuit comprises: a first control circuit and a second control circuit respectively couple to a power input of the storage drive via a first diode and a second diode, wherein the first diode and the second diode isolate the first control circuit and the second control circuit from reverse bias current flow.

9. The method of claim 1, wherein the processor encodes the initial predetermined dual bit pattern on each pair of bit pins of a shift register when the storage drive is connected at a respective pair of bit pins associated with the shift register.

10. The method of claim 1, wherein the processor is a specialized service processor for monitoring a physical state of the IHS.

11. An information handling system (IHS) comprising:
a processor;
a storage drive;
a power control circuit having a first control circuit and a second control circuit that is respectively coupled to a power input of the storage drive to selectively power the storage drive; and a service processor communicatively coupled to the storage drive and to the power control circuit and which executes a power encoder module that configures the service processor to:

select an initial predetermined dual bit pattern that corresponds to a select power state of the storage drive during a fault condition for providing to a first bit pin and a second bit pin of a bit pin pair of a power control circuit that respectively connects to the storage drive;

provide the initial predetermined dual bit pattern to a circuit element of the power control circuit, wherein the circuit element converts the initial predetermined dual bit pattern to a single bit, which generates a discrete signal to a power input component of the storage drive to selectively implement a power change for use during a fault condition;

encode the initial predetermined dual bit pattern on the first bit pin and the second bit pin of the bit pin pair of the power control circuit to selectively implement a power change, corresponding to the initial predetermined dual bit pattern, on the storage drive; and in response to detection of a fault generated dual bit pattern, selectively managing power to the storage drive based on input of the discrete signal, wherein the discrete signal selectively identifies a power state that conditionally implements a power change.

12. The IHS of claim 11, wherein the power encoder module further configures the service processor to:

encode the initial predetermined dual bit pattern on the first bit pin and the second bit pin based on an initial state of a shift register, wherein each circuit of the power control circuit includes therein a first terminal for coupling to a first bit pin of a bit pin pair and a second terminal for coupling to a second bit pin of the bit pin pair.

13. The IHS of claim 11, wherein the first control circuit and the second control circuit are respectively coupled to the storage drive via a first diode and a second diode, wherein the first diode and the second diode isolate the first control circuit and the second control circuit from reverse bias current flow.

14. The IHS of claim 11, wherein the power encoder module further configures the service processor to:

generate a second predetermined bit pattern to one or more subsequent bit pin pairs of the power control circuit for selectively enabling and disabling power to another storage drive, wherein a power enable predetermined bit pattern is a different bit pattern from a power disable predetermined dual bit pattern.

15. The IHS of claim 11, wherein the power encoder module further configures the service processor to: select each predetermined dual bit pattern to correlate to a desirable state of the storage drive in response to the fault condition, which is a specific fault condition from among a plurality of fault conditions, wherein each fault condition generates a unique detectable signal that corresponds to a preidentified fault activity associated with the specific fault condition.

16. The IHS of claim 11, wherein the power encoder module further configures the service processor to:

input the discrete signal to manage a power input of the storage drive via one or more of a general purpose input/output (GPIO) drive, serial GPIO drive, a two wire interface, field programmable gate array, and a serial in parallel out shift register.

17. The IHS of claim 11, wherein the power encoder module further configures the service processor to:
provide one of an active high signal and an active low signal for each bit pin of the initial predetermined dual bit pattern to the circuit element via a shift register; and
receive, at the circuit element, one of the active high signal and the active low signal from the shift register for generating the discrete signal to manage a power input of the storage drive.

18. The IHS of claim 11, wherein the circuit element is a p-channel field effect transistor.

19. The IHS of claim 11, wherein the processor encodes the initial predetermined dual bit pattern on each pair of bit pins of a shift register when the storage drive is connected at a respective pair of pins associated with the shift register.

20. The IHS of claim 11, wherein the service processor is a specialized service processor for monitoring the physical state of the IHS.

* * * * *